June 17, 1952 O. E. WOLFF 2,601,013
SAFETY COUPLING
Filed Aug. 8, 1947

INVENTOR
Otto E. Wolff
BY Donald R. Brown
Attorney

Patented June 17, 1952

2,601,013

UNITED STATES PATENT OFFICE 2,601,013

SAFETY COUPLING

Otto E. Wolff, Cambridge, Mass., assignor of one-fourth to Polaroid Corporation, Cambridge, Mass., a corporation of Delaware Application August 8, 1947, Serial No. 767,558
In Canada July 20, 1942

9 Claims. (Cl. 64—30)

1

This invention relates to torque-transmitting devices, and more particularly to novel and improved coupling or clutch means for operatively connecting rotary members.

It is one object of the present invention to provide a coupling or clutch for transmitting torques up to a predetermined torque, said coupling embodying novel, readily adjustable means for controlling the maximum transmittable torque.

Still another object is to provide a novel safety coupling or clutch adapted to interconnect a driving and driven member for the transmission between said members of torques up to a predetermined torque and adapted to effect substantially complete and frictionless disengagement between said members when said predetermined torque is exceeded.

A still further object is to provide a coupling or clutch of the above character wherein re-engagement of the driving and driven members is automatically obtained by bringing said members to the same rotational speed as, for example, by bringing both members to rest.

A further object is the provision of a novel clutch or coupling which is simple, compact, and reliable in operation and which can be readily and economically manufactured and assembled.

A further object is the provision of a novel clutch or coupling construction wherein there is provided a plurality of shoes and a substantially continuous shoe-engaging surface and novel engagement may be obtained between said shoes means are included in the construction for mounting the shoes so that a predetermined frictional and surface when a torque is being transmitted.

The invention accordingly comprises the features of the construction, combination of elements and arrangements of parts which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 3 is a perspective view of the element of

Figure 2:
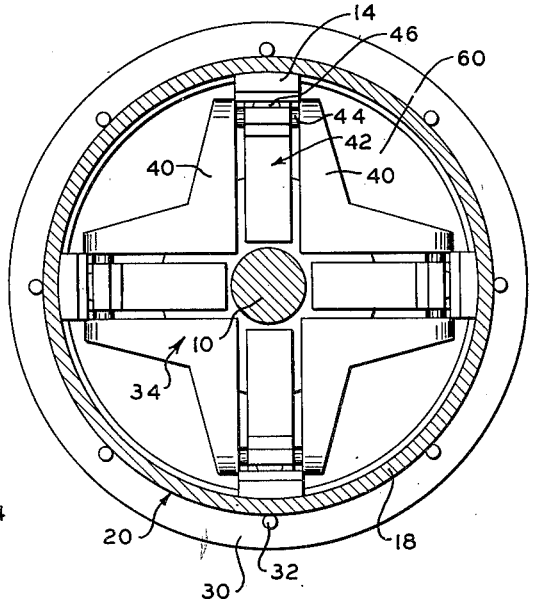
Fig. 2 is a sectional view taken substantially along line 2—2 of Fig. 1.
Figure 4:
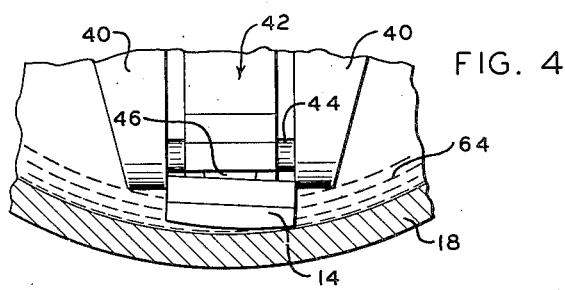

2 the coupling which is adapted to connect with the driving shaft and to mount the clutch shoes for operative engagement with the shoe-engaging surface; and Fig. 4 is an enlarged, fragmentary sectional view of a portion of the structure of Fig. 2 showing the frictional surfaces of said coupling in disengaged position.

Referring to the drawings, the novel power-transmitting device of the present invention is illustrated by way of example in the form of a self-contained, relatively simple and compact unit which may be readily adapted to interconnect a pair of rotary members to serve as a clutch or a coupling for said members. In the form shown, the coupling is adapted to provide a torque-transmitting connection between a driving shaft 10 and a pulley 12, but it is to be expressly understood, however, that the novel structure of the invention is not limited to the transmission of a torque from a shaft to a pulley, but may be utilized to transmit torque between any members adapted for angular rotation with respect to one another as, for example, to transmit torque from a driving shaft to a driven shaft or from the motor of a hand-operated tool to the tool element thereof.

The torque-transmitting device of the invention comprises a plurality of shoes 14 and a substantially continuous shoe-engaging surface 16 and, as shown, said shoe-engaging surface is provided by that portion of the device which mounts the driven member, i. e., pulley 12, and said shoes are drivably connected to the driving member, i. e., shaft 10. Shoe-engaging surface 16 constitutes the inner peripheral surface of an outer cylindrical portion 18 of a cup-shaped housing member 20 which is provided at its inner circumference with a pair of co-axial, axially-spaced cylindrical flange portions 20a and 20b connected by a shoulder 20c. The recess defined by flange 20a and shoulder 20c serves to mount a fluid seal 22 of any conventional construction which is adapted to engage the peripheral surface of shaft 10 and prevent flow of fluid from the interior of housing member 20 along said shaft. A bushing 24 is mounted in flange portion 20b and provides a bearing surface for shaft 10.

To mount pulley 12 and to form a fluid-tight chamber with housing member 20, there is provided a suitable housing section 25 having a hub portion 26 to which pulley 12 is fixedly secured for rotation therewith by any suitable means such as a set screw, spline or key (not shown).

A radially extending flange 28 may form an integral part of said housing section 25 and is secured, as by means of screws 32, at its outer edge to a flange 30, the latter preferably being an integral extension of portion 18 of member 20.

Figure 3:
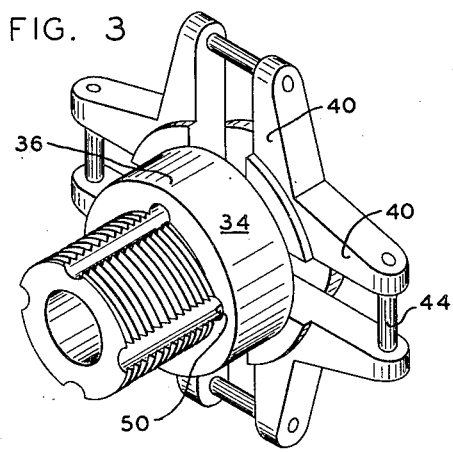

To mount friction shoes 14 for operative engagement with shoe-engaging surface 16, there is preferably provided a novel spider element 34 (Figs. 1 and 3) comprising a hub 36 mounted on shaft 10 for rotation therewith as, for example, by being splined, keyed or otherwise secured thereto, and whose outer periphery is journaled in a bushing 38 mounted within the bore of hub member 26. Extending from hub 36 in a substantially radial direction is a plurality of pairs of arms 40, each pair of said arms being adapted to operatively mount one of shoes 14. A plurality of shoes 14 is preferably provided, and in the form herein described four are used. Each pair of arms 40 has mounted therebetween a lever such, for example, as a bell crank lever 42, a pin 44 being provided for mounting each said lever for pivotal movement about an axis perpendicular to the axis of shaft 10. One arm of each said bell crank lever 42 (Fig. 1) is adapted to extend substantially parallel to said axis of rotation and is provided with a mounting member 46 in the form of a pin having a semi-spherical head portion which fits into a conforming recess provided in the lower end of each of shoes 14, and thereby mounts each said shoe for limited universal pivotal movement with respect to said lever arm. Each of shoes 14 preferably has its frictional surface, i. e., the surface thereof adapted to engage shoe-engaging surface 16, conforming to the curvature of the latter surface so that an optimum frictional engagement is obtained during torque transmission.

Figure 1:
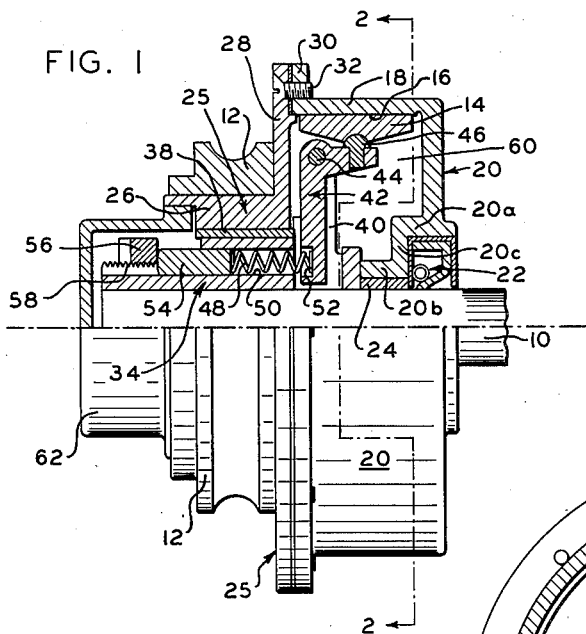
Figure 1 is a view, partly in section and partly in elevation, of one form of clutch or coupling embodying the structure of the present invention, the section being taken through the axis of the driving shaft of the coupling.

In order to urge shoes 14 into engagement with shoe-engaging surface 16 with a predetermined force, there is preferably provided means for acting on each of the radially extending arms of lever 42 tending to pivot the upper lever, as viewed in Fig. 1, in a counterclockwise direction, thereby biasing the arm which mounts shoes 14 in the direction of surface 16. As shown, said lever-engaging means comprise a plurality of coil springs 48, each of which is mounted in a suitable passage 50, bored into hub 36 in a direction substantially parallel to the axis of rotation thereof. Each said passage is located so as to be opposite the lower end of one of the radially extending arms of a bell crank lever 42. One end of each of springs 48 bears against the arm of said bell crank lever, the latter being preferably provided with a suitable recess 52 for receiving said end, and the other end of said spring is held by a pin 54. One of said pins 54 extends into and is adapted to substantially fill the outer end of each of passages 50, preventing any appreciable loss of liquid through said passages. Each of pins 54 is in turn engaged by the inner end of a nut member 56 threaded on an externally threaded portion 58 of hub 36, which threaded portion has a reduced outer diameter such that its periphery leaves a portion at least of each passage exposed, so that said nut 56 is able to bear against the ends of pins 54.

It is apparent that by adjusting the location of nut 56 on threaded portion 58 it is possible to adjust the compression under which springs 48 are held, and therefore the force with which shoes 14 are normally urged into frictional engagement with shoe-engaging surface 16. It will also be apparent from the foregoing construction that torques may be transmitted from shaft 10 through spider 34 to levers 42 and thence to shoes 14, from which they may be transmitted to shoe-engaging surface 16 and through housing 18 and hub 26 to pulley 12, causing the latter to rotate with shaft 10. In the event a torque in excess of that which can be transmitted from shoes 14 to shoe-engaging surface 16 for any condition of compression of springs 48 is applied, the shoes 14 will slip with respect to shoe-engaging surface 16.

The novel coupling construction of the present invention is particularly adapted to effect substantially complete disengagement between the driving shaft 10 and pulley 12 when the predetermined maximum transmittable torque is exceeded, the disengagement being such that re-engagement will not occur until there is no relative rotation between said members as, for example, when both are at rest. In order to achieve this result, a lubricant is preferably provided in the chamber 60 formed by housing members 18 and 25. It will be noted that bushing 38 cooperates with hubs 26 and 36 to provide a fluid seal at one end of chamber 60 and sealing means 22 seals the other end of the chamber. Such small quantities of lubricant as may escape from chamber 60, for example, through passages 50, may be trapped by securing a suitable end closure element 62 to hub member 26. In the embodiment shown in the drawings, hub member 26 has an internally threaded extension into which closure element 62 is threaded and it is to be noted that said closure element, when so mounted, serves to enclose nut member 56, preventing inadvertent change in the adjustment of nut member 56.

When shoes 14 are formed of metal, the lubricant is preferably an oil and a quantity thereof is provided in chamber 60 at least sufficient to cover shoe-engaging surface 16 with a film thereof during rotation of the coupling. When the maximum transmittable torque is exceeded and shoes 14 begin to slip relative to surface 16, this slipping action, because of the pivotal mounting of said shoes, will cause the latter to tilt somewhat about an axis substantially perpendicular to the direction of rotation thereof, i. e., substantially parallel to the axis of rotation of shaft 10, thereby producing a wedge effect between the friction surfaces. When this wedge action takes place, a lubricating film 64 of the oil within chamber 60 is forced between said engaging surfaces and, in effect, produces a complete separation of said surfaces, as illustrated in somewhat exaggerated fashion in Fig. 4. Substantially no torque can be transmitted from the driven member to the driving member while this condition exists, which is as long as shoes 14 are rotating at a different angular velocity than housing member 18. Re-engagement of the friction surfaces for the purpose of effecting a power transmission from shaft 10 to pulley 12 is not achieved until there is no relative rotation between said shaft and said pulley. Under normal operating conditions, in order to effect re-engagement between the frictional surfaces so as to make possible the further power transmission from the driven to the driving members, it is necessary to bring said members to rest or to completely unload the driven member, i. e., pulley 12, so that the drag of the lubricating film 64 is sufficient to bring the latter member to the speed of the driving member.

In general, when one surface slides over a conforming surface in the presence of a lubricant, as when the shoes are slipping, the distribution of pressure in the lubricant depends on the bearing pressure, speed, viscosity of the lubricant, the geometry of the surfaces and the method of support. The ratio of the free slipping torque to the torque which causes slipping varies with speed and viscosity, but is normally of the order of one per cent or less. The static frictional coefficients depend, of course, on the materials and the characteristics of the surfaces, but do not vary a significant amount for a given pair of materials. Shoes 14 may be of plastic or rubber, but in the above-described embodiment are preferably of metal, and lubricants may be straight mineral oils. Oiliness additives are in general undesirable, but anti-oxidants, anti-foam and extreme pressure agents may be added. The lowest viscosity which will give adequate lubrication is preferred, in order to minimize the free slipping torque. Water and aqueous solutions may be used with rubber shoes. Water appears to be an adequate lubricant where speeds are high or the load is light. Metal shoes, for example, of steel, may take loads up to five hundred pounds per square inch.

In the above-described embodiment of the invention, shoes 14 are pivoted centrally on the head of pin 46 and this provides for operation of the coupling in either direction. Where the unit is to operate in one direction only, the free slipping torque may be reduced somewhat by pivoting the shoes closer to their trailing edges.

There is thus provided a novel torque-transmitting device useful particularly as a coupling and embodying novel means for mounting friction members for operative engagement with one another, and novel means for automatically effecting substantially complete disengagement of said members when a predetermined torque is exceeded. There is also provided novel means for controlling the frictional engagement between the friction members so as to vary the maximum torque which can be transmitted.

Since certain changes in the constructions set forth which embody the invention may be made without departing from its scope, it is intended that all matter contained in the above description or shown in the accompanying drawings shall be interpreted as illustrative, and not in a limiting sense.

What is claimed is:

1. In a device for transmitting torque between a pair of members adapted for rotation with respect to one another about a predetermined axis of rotation, a housing, means connected to one of said members providing a friction surface in said housing, a lubricant contained in said housing and adapted to cover said shoe-engaging surface during operation of said device, a plurality of friction shoes in said housing for frictionally engaging said surface, a shoe-mounting element fixed to said other member, a plurality of levers pivotally mounted on said shoe-mounting element, each said lever having one of said shoes mounted thereon so that said shoe can pivot about an axis substantially perpendicular to its direction of movement, said lubricant being capable of disengaging said shoes from said surface whenever there is relative rotation between said shoes and said surface, means carried by said shoe-mounting element for engaging each of said levers for applying a pressure thereto tending to pivot the same so as to bias the shoes mounted thereon into engagement with said friction surface, and means carried by said shoe-mounting element for varying the pressure applied by said lever-engaging means to vary the maximum torque transmittable by said device.

2. In a device for transmitting torque between a pair of members adapted for rotation with respect to one another about a predetermined axis of rotation, means connected to one of said members providing a friction surface, means cooperating with said first-named means to provide a fluid-tight housing, said housing containing a lubricant adapted to cover said shoe-engaging surface during operation of said device, a plurality of friction shoes for frictionally engaging said surface, a shoe-mounting element fixed to said other member, a plurality of levers pivotally mounted on said shoe-mounting element, each said lever having one of said shoes mounted thereon so that said shoe can pivot about an axis substantially parallel to said axis of rotation, said lubricant being capable of disengaging said shoes from said surface whenever there is relative rotation between said shoes and said surface, and means for engaging each of said levers for applying a pressure thereto tending to pivot the same so as to bias the shoes mounted thereon into engagement with said friction surface, said last-named means comprising a plurality of springs and pins carried by said shoe-mounting element, each spring being compressed between one of said pins and one of said levers.

3. In a device for transmitting torque between a pair of members adapted for rotation with respect to one another about a predetermined axis of rotation, means connected to one of said members providing a friction surface, means cooperating with said first-named means to provide a fluid-tight housing, said housing containing a lubricant adapted to cover said shoe-engaging surface during operation of said device, a plurality of friction shoes for frictionally engaging said surface, a shoe-mounting element fixed to said other member, a plurality of levers pivotally mounted on said shoe-mounting element, each said lever having one of said shoes mounted thereon so that said shoe can pivot about an axis substantially parallel to said axis of rotation, said lubricant being capable of disengaging said shoes from said surface whenever there is relative rotation between said shoes and said surface, means for engaging each of said levers for applying a pressure thereto tending to pivot the same so as to bias the shoes mounted thereon into engagement with said friction surface, said last-named means comprising a plurality of springs and pins carried by said shoe-mounting element, each spring being compressed between one of said pins and one of said levers, and a member adjustably mounted on said shoe-mounting element for engaging said pins and varying the position thereof to vary the compression under which each said spring is held and the pressure exerted by said springs on said levers.

4. In a device for transmitting torque between a pair of members adapted for rotation with respect to one another about a predetermined axis of rotation, means connected to one of said members providing a friction surface, means cooperating with said first-named means to form a fluid-tight housing, said housing containing a lubricant adapted to cover said shoe-engaging surface during operation of said device, a plurality of friction shoes for frictionally engaging said surface, a shoe-mounting element fixed to said other member, a plurality of levers pivotally mounted intermediate their ends on said shoe-mounting element, each said lever having one of said shoes pivotally mounted on one end thereof so that said shoe can pivot about an axis substantially parallel to said axis of rotation, said lubricant being capable of substantially completely disengaging said shoes from said surface whenever there is relative rotation between said shoes and said surface, means carried by said shoe-mounting element for engaging the other end of each of said levers for applying a pressure thereto tending to pivot the same so as to bias the shoe mounted thereon into engagement with said friction surface, and means carried by said shoe-mounting element for varying the pressure applied by said lever-engaging means to vary the maximum torque transmittable by said device.

5. In a device for transmitting torque between a pair of members adapted for rotation with respect to one another about a predetermined axis of rotation, means connected to one of said members providing a friction surface, means cooperating with said first-named means to form a fluid-tight housing, said housing containing a lubricant adapted to cover said shoe-engaging surface during operation of said device, a plurality of friction shoes for frictionally engaging said surface, a shoe-mounting element fixed to said other member, a plurality of levers pivotally mounted intermediate their ends on said shoe-mounting element for pivotal movement about an axis substantially perpendicular to said axis of rotation, each said lever having one of said shoes pivotally mounted on one end thereof so that said shoe can pivot about an axis substantially parallel to said axis of rotation, said lubricant being capable of substantially completely disengaging said shoes from said surface whenever there is relative rotation between said shoes and said surface, and means carried by said shoe-mounting element for engaging the other end of each of said levers for applying a pressure thereto tending to pivot the same so as to bias the shoe mounted thereon into engagement with said friction surface.

6. In a device for transmitting torque from a rotary driving member to a rotary driven member, means connected to one of said members providing a continuous shoe-engaging surface, a plurality of friction shoes for operatively engaging said surface, means cooperating with said first-named means to form a fluid-tight housing, said housing containing a lubricant accessible to said shoes and said surface, means for connecting said shoes to the other of said members and for so mounting said shoes that said lubricant substantially completely disengages said shoes from said surface whenever there is relative rotation between said shoes and said surface, said last-named means comprising a shoe-mounting element connected to said last-named member for rotation therewith and a plurality of bell crank levers mounted on said shoe-mounting element for movement about an axis perpendicular to the axis of rotation of said last-named rotary member, one arm of each said lever mounting one of said shoes for pivotal movement about an axis substantially parallel to the axis of rotation of said last-named member, and means engaging the other arm of each of said levers for applying a pressure thereto tending to pivot said levers and bias the shoes mounted thereon into engagement with said shoe-engaging surface.

7. In a device for transmitting torque from a rotary driving member to a rotary driven member, means connected to one of said members providing a continuous shoe-engaging surface, a plurality of friction shoes for operatively engaging said surface, means cooperating with said first-named means to form a fluid-tight housing, said housing containing a lubricant accessible to said shoes and said surface, means for connecting said shoes to the other of said members and for so mounting said shoes that said lubricant substantially completely disengages said shoes from said surface whenever there is relative rotation between said shoes and said surface, said last-named means comprising a spider connected to said last-named member for rotation therewith and a plurality of bell crank levers mounted on said spider for pivotal movement about axes perpendicular to the axis of rotation of said last-named rotary member, one arm of each said lever extending substantially parallel to said axis of rotation and the other arm of each said lever extending substantially radially with respect to said axis of rotation, each of said axially extending arms of said levers providing a pivotal mounting for one of said shoes whereby said shoe may pivot about an axis substantially parallel to said axis of rotation, and means engaging the radially extending arm of each said lever for applying a pressure to said arm tending to pivot said lever and bias the shoe mounted thereon into engagement with said shoe-engaging surface.

8. In a device for transmitting torque from a rotary driving member to a rotary driven member, means connected to one of said members providing a continuous shoe-engaging surface, a plurality of friction shoes for operatively engaging said surface, means cooperating with said first-named means to form a fluid-tight housing, said housing containing a lubricant accessible to said shoes and said surface, means for connecting said shoes to the other of said members and for so mounting said shoes that said lubricant substantially completely disengages said shoes from said surface whenever there is relative rotation between said shoes and said surface, said last-named means comprising a spider connected to said last-named member for rotation therewith and a plurality of bell crank levers mounted on said spider for pivotal movement about axes perpendicular to the axis of rotation of said last-named rotary member, one arm of each said lever extending substantially parallel to said axis of rotation and the other arm of each said lever extending substantially radially with respect to said axis of rotation, each of said axially extending arms of said levers providing a pivotal mounting for one of said shoes whereby said shoe may pivot about an axis substantially parallel to said axis of rotation, means engaging the radially extending arm of each said lever for applying a pressure to said arm tending to pivot said lever and bias the shoe mounted thereon into engagement with said shoe-engaging surface, said arm-engaging means comprising a plurality of springs, each spring acting on one of said levers, and means engaging one end of each of said springs to hold the same under compression.

9. In a device for transmitting torque from a rotary driving member to a rotary driven member, means connected to one of said members providing a continuous shoe-engaging surface, a plurality of friction shoes for operatively engaging said surface, means cooperating with said first-named means to form a fluid-tight housing, said housing containing a lubricant accessible to said shoes and said surface, means for connecting said shoes to the other of said members and for so mounting said shoes that said lubricant substantially completely disengages said shoes from said surface whenever there is relative rotation between said shoes and said surface, said last-named means comprising a spider connected to said last-named member for rotation therewith and a plurality of bell crank levers mounted on said spider for pivotal movement about axes perpendicular to the axis of rotation of said last-named rotary member, one arm of each said lever extending substantially parallel to said axis of rotation and the other arm of each said lever extending substantially radially with respect to said axis of rotation, each of said axially extending arms of said levers providing a pivotal mounting for one of said shoes whereby said shoe may pivot about an axis substantially parallel to said axis of rotation, means engaging the radially extending arm of each said lever for applying a pressure to said arm tending to pivot said lever and bias the shoe mounted thereon into engagement with said shoe-engaging surface, said arm-engaging means comprising a plurality of springs, each of said springs acting on one of said levers, a plurality of pins, each of said pins engaging one end of one of said springs and holding the same under compression, and a nut member mounted on said spider and capable of adjusting the position of said pins to vary the compression under which said springs are held.

OTTO E. WOLFF.

REFERENCES CITED

The following references are of record in the file of this patent:

UNITED STATES PATENTS

| Number | Name | Date |
|---|---|---|
| 453,810 | Howe | June 9, 1891 |
| 788,810 | Ambler | May 2, 1905 |
| 1,440,575 | Anderson | Jan. 2, 1923 |
| 1,448,034 | Nelson | Mar. 13, 1923 |
| 2,400,585 | Wolff | May 21, 1946 |